(12) United States Patent
Kodera et al.

(10) Patent No.: US 7,911,701 B2
(45) Date of Patent: Mar. 22, 2011

(54) MICRO LENS ARRAY SHEET FOR USE IN BACKLIGHT DEVICE AND MOLDING ROLL FOR MANUFACTURING SUCH MICRO LENS ARRAY SHEET

(75) Inventors: Yuji Kodera, Ibaraki (JP); Yukinori Yamada, Ibaraki (JP); Nobuyasu Ishihara, Ibaraki (JP); Shirou Hayashihara, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 109 days.

(21) Appl. No.: 12/373,026

(22) PCT Filed: Aug. 22, 2007

(86) PCT No.: PCT/JP2007/066302
§ 371 (c)(1),
(2), (4) Date: Jan. 8, 2009

(87) PCT Pub. No.: WO2008/026490
PCT Pub. Date: Mar. 6, 2008

(65) Prior Publication Data
US 2009/0244713 A1    Oct. 1, 2009

(30) Foreign Application Priority Data
Aug. 30, 2006   (JP) .................................. 2006-233407

(51) Int. Cl.
*G02B 27/10* (2006.01)
*C03B 23/07* (2006.01)

(52) U.S. Cl. .......................................... 359/620; 65/140
(58) Field of Classification Search .................. 359/619, 359/620; 65/140, 302
See application file for complete search history.

(56) References Cited

U.S. PATENT DOCUMENTS

| 2002/0085287 A1 | 7/2002 | Egawa |
| 2006/0126185 A1* | 6/2006 | Oh et al. ....................... 359/619 |

FOREIGN PATENT DOCUMENTS

| JP | 2001-030273 A | 2/2001 |
| JP | 2002-048903 A | 2/2002 |
| JP | 2003-080598 A | 3/2003 |
| JP | 2003-185804 A | 7/2003 |
| JP | 2003-262706 A | 9/2003 |
| JP | 2004-126376 A | 4/2004 |
| JP | 2004-145328 A | 5/2004 |
| JP | 2004-145329 A | 5/2004 |
| JP | 2004-191611 A | 7/2004 |
| JP | 2004-309557 A | 11/2004 |

* cited by examiner

*Primary Examiner* — William C Choi
(74) *Attorney, Agent, or Firm* — Birch, Stewart, Kolasch & Birch, LLP

(57) ABSTRACT

A micro lens array sheet includes a sheet type base and a plurality of micro lenses arranged on the base. The surface of each micro lens includes a convex part and a peripheral edge part. The convex part has a spherical or elliptical surface. The peripheral edge part is formed between the convex part and the base and curved in a concave shape. Since the surface of the peripheral edge part is curved in a concave shape, the flat part can be narrower than a conventional micro lens array sheet. Therefore, luminance unevenness attributable to the flat part can be suppressed.

3 Claims, 9 Drawing Sheets

MICRO LENS ARRAY SHEET FOR USE IN BACKLIGHT DEVICE AND MOLDING ROLL FOR MANUFACTURING SUCH MICRO LENS ARRAY SHEET

TECHNICAL FIELD

The present invention relates to a micro lens array sheet and a molding roll and more specifically to a micro lens array sheet for use in a backlight device and a molding roll for manufacturing the micro lens array sheet.

BACKGROUND ART

A display device such as a liquid crystal display needs high front side luminance. Therefore, a backlight device included in such a display device has an optical lens sheet laid thereon in order to improve the front side luminance.

A micro lens array sheet is an optical lens sheet used in a backlight device to improve the front side luminance. Such micro lens array sheets each for use in a backlight device are disclosed by JP 2004-145329 A, JP 2004-145328 A, JP 2004-126376 A, JP 2004-191611 A, and JP 2004-309557 A.

The micro lens array sheet is sheet-shaped and has a plurality of convex lenses (micro lenses) in a lattice arrangement on one surface. The micro lens array sheet for use in a backlight device improves the front side luminance by gathering light diffused from a light source by the plurality of micro lenses and emitting the light.

There is a method of producing an optical lens sheet called "roll-to-roll method," according to which a molding pattern of ionizing radiation curing resin is formed on a sheet type substrate film using a molding roll having grooves or holes for forming lenses at the outer peripheral surface. According to the method, the lens forming grooves or holes formed at the outer peripheral surface of the molding roll are filled with the ionizing radiation curing resin. Then, the sheet type substrate film is wound around the outer peripheral surface of the molding roll filled with the ionizing radiation curing resin, and ionizing radiation is carried out. The ionizing radiation curing resin is cured by the ionizing radiation, so that a plurality of lenses (such as prisms and micro lenses) are formed on the substrate film. Through these steps, the optical lens sheet is produced.

When a micro lens array sheet is produced by the roll-to-roll method, a flat surface (hereinafter referred to as "flat part") is present between micro lenses adjacent to each other on the micro lens array sheet. The flat part does not contribute to the collection of light at all, and therefore in consideration of the light collection effect, the flat part is preferably eliminated by placing the micro lenses in contact with each other.

However, when a micro lens array sheet is produced by the roll-to-roll method, it is substantially impossible to place the micro lenses in contact with each other because the edges of the lens forming holes on the molding roll must be in contact with each other in order to place the micro lenses in contact with each other. In this case, the edges of the holes on the molding roll have reduced strength and become more prone to cracks, so that the useful life of the molding roll is shortened. Therefore, when a micro lens array sheet is produced by the roll-to-roll method, a flat part having a prescribed width is provided between the micro lenses.

However, when a micro lens array sheet with such a flat part is used in a backlight device, luminance unevenness is generated. The flat part does not contribute to the collection of light and therefore directly emits light that comes perpendicularly from the plurality of line sources arranged in parallel to one another in the backlight device. Therefore, the luminance immediately above the line sources is greater than that of the other part, which results in luminance unevenness.

Note that JP 9-21903 A and JP 2000-249807 A are other patent documents having disclosure related to the present invention.

DISCLOSURE OF THE INVENTION

It is an object of the present invention to provide a micro lens array sheet that can suppress luminance unevenness and a molding roll for manufacturing such a micro lens array sheet.

A micro lens array sheet according to the invention is used in a backlight device. The micro lens array sheet includes a sheet type substrate and a plurality of micro lenses arranged on the substrate. The plurality of micro lenses each have a surface. The surface of the micro lens includes a convex part and a peripheral edge part. The convex part has a spherical or elliptical surface. The peripheral edge part is formed between the convex part and the substrate and curved in a concave shape.

In the micro lens array sheet according to the invention, the peripheral edge part is curved in a concave shape and smoothly connected to the surface of the substrate. The peripheral edge part is thus curved in a concave shape, and therefore the flat part can be smaller than that of the conventional micro lens array sheet. Therefore, the luminance unevenness can be suppressed.

A molding roll according to the invention is used for producing a micro lens array sheet. The molding roll includes a plurality of lens forming holes formed on its outer peripheral surface. The plurality of lens forming holes each have a surface. The surface of the lens forming hole includes a concave part and a peripheral edge part. The concave part has a spherical or elliptical surface and the peripheral edge part is formed between the concave part and the outer peripheral surface of the molding roll and rounded.

In the molding roll according to the invention, the peripheral edge part of the lens forming hole is rounded, so that the above-described micro lens array sheet can be manufactured. Furthermore, since the peripheral edge part of the lens forming hole is rounded, the micro lens array sheet produced by the roll-to-roll method can be more easily removed from the molding roll.

BEST MODE FOR CARRYING OUT THE INVENTION

Figure 1:
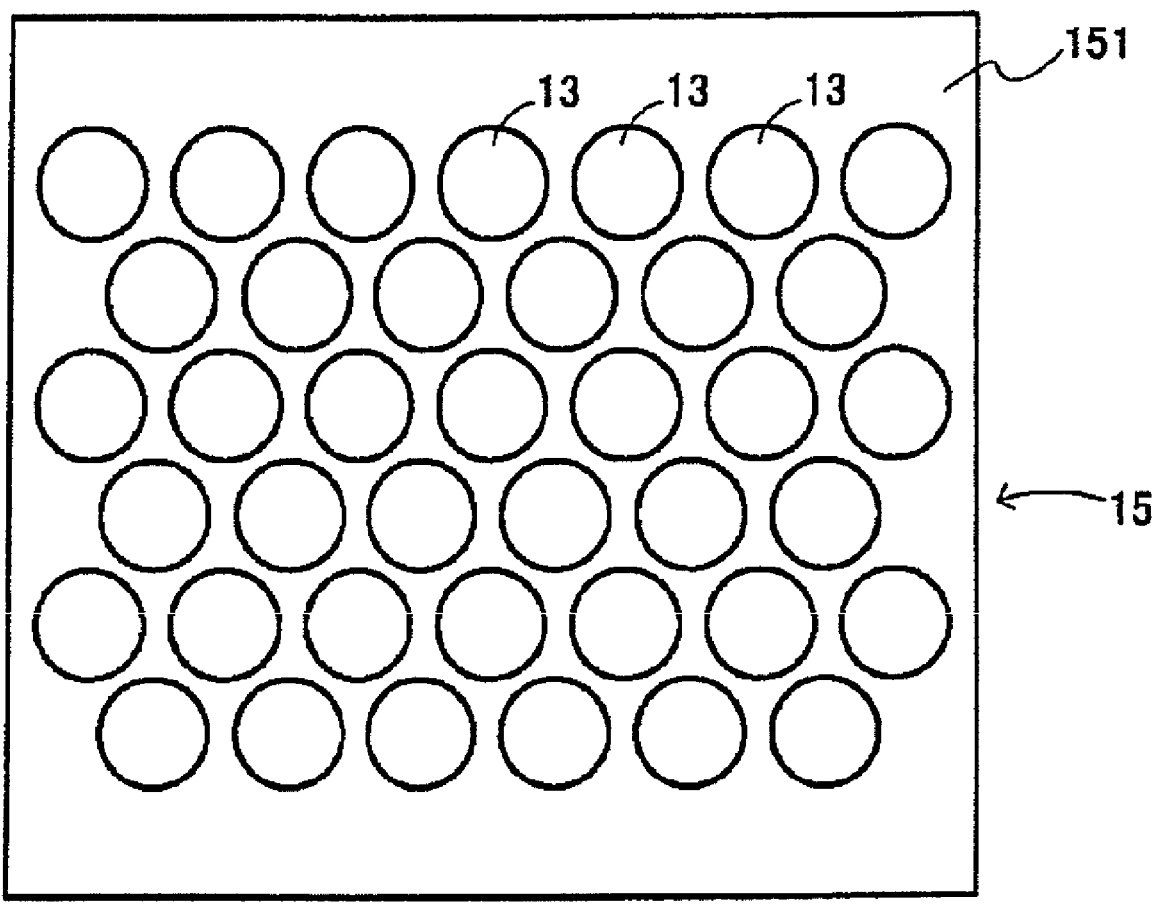
FIG. 1 is a top view of a micro lens array sheet according to an embodiment of the invention.

Now, an embodiment of the invention will be described in detail with reference to the drawings, in which the same or corresponding portions are designated by the same reference characters, and their description will not be repeated.

1. Micro Lens Array Sheet

Figure 2:
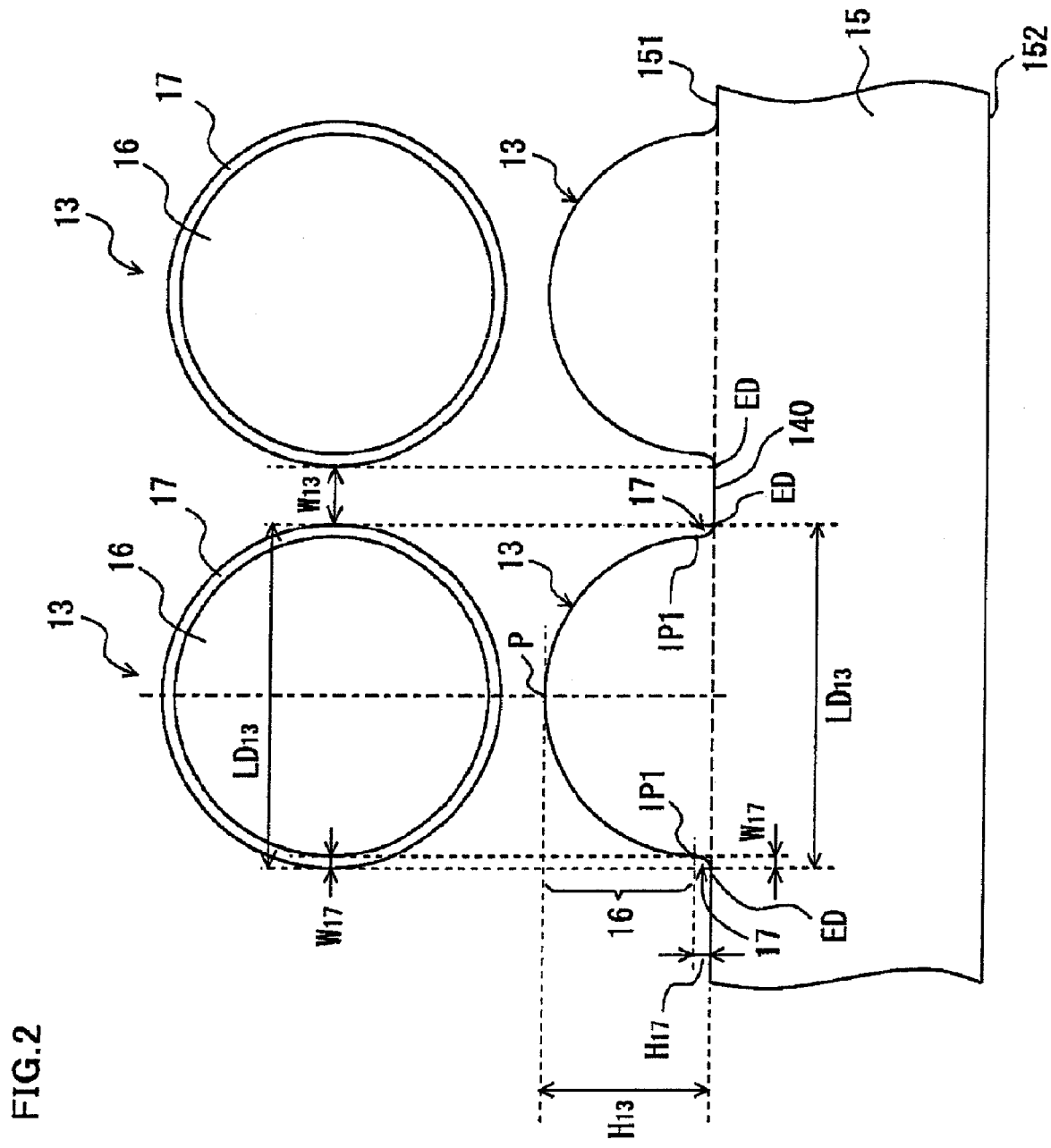
FIG. 2 includes a top view and a cross sectional view of the micro lens array sheet shown in FIG. 1.

Referring to FIGS. 1 and 2, a micro lens array sheet 14 has a sheet type substrate 15 and micro lenses 13 provided in a lattice arrangement on one surface 151 of the substrate 15. Note that the other surface 152 on the opposite side to the surface 151 is flat.

The surface of the micro lens 13 includes a convex part 16 and a peripheral edge part 17. The convex part 16 is the part from the peak P to the peripheral edge part 17 of the micro lens 13 and has a spherical surface. The peripheral edge part 17 is formed between the convex part 16 and the substrate 15. The peripheral edge part 17 is curved in a concave shape and smoothly connected to the surface 151. As shown in FIG. 2, the surface of the micro lens 13 in cross section is defined by a curve including an inflection point IP1. The convex part 16 is the part between the peak P and the inflection point IP1, and the peripheral edge part 17 is the part between the inflection point IP1 and the edge ED.

Note that the part 140 between adjacent micro lenses 13 at the surface of the substrate 151 is flat. (The part is referred to as "flat part 140" in the following paragraphs.)

The convex part 16 of the micro lens 13 described above has a spherical surface but it may have an elliptical surface.

Examples of the resin of the substrate 15 may include a polyester-based resin, a polycarbonate-based resin, a polyacrylate-based resin, an alicyclic polyolefin-based resin, a polystyrene-based resin, a polyvinyl chloride-based resin, a polyvinyl acetate-based resin, a polyether sulfonate-based resin, and a triacetylcellulose-based resin. The micro lens 13 is made of the same resin as the substrate 15.

The micro lens array sheet 14 can suppress the luminance unevenness better than the conventional micro lens array sheet does because of its peripheral edge part 17. This will be described in the following paragraphs.

Figure 3:
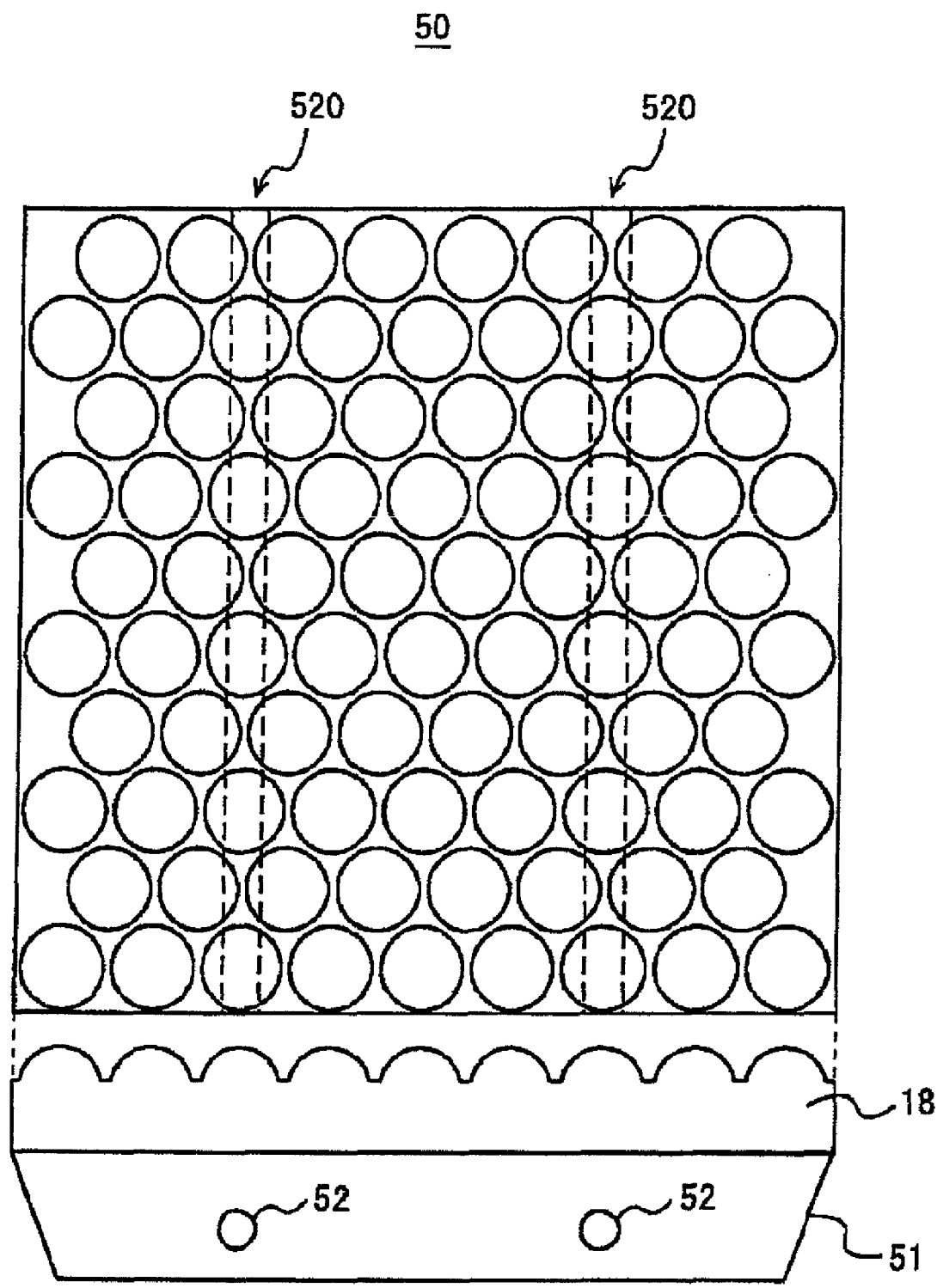
FIG. 3 includes a top view and a cross sectional view of the backlight device.

As shown in FIG. 3, the backlight device 50 typically includes a box shaped housing 51 whose top is open, a plurality of line sources (such as cold cathode fluorescent lamps) 52 arranged in parallel to one another in the housing 51, and one or more optical lens sheets 18 laid at the opening of the housing 51.

Figure 4:
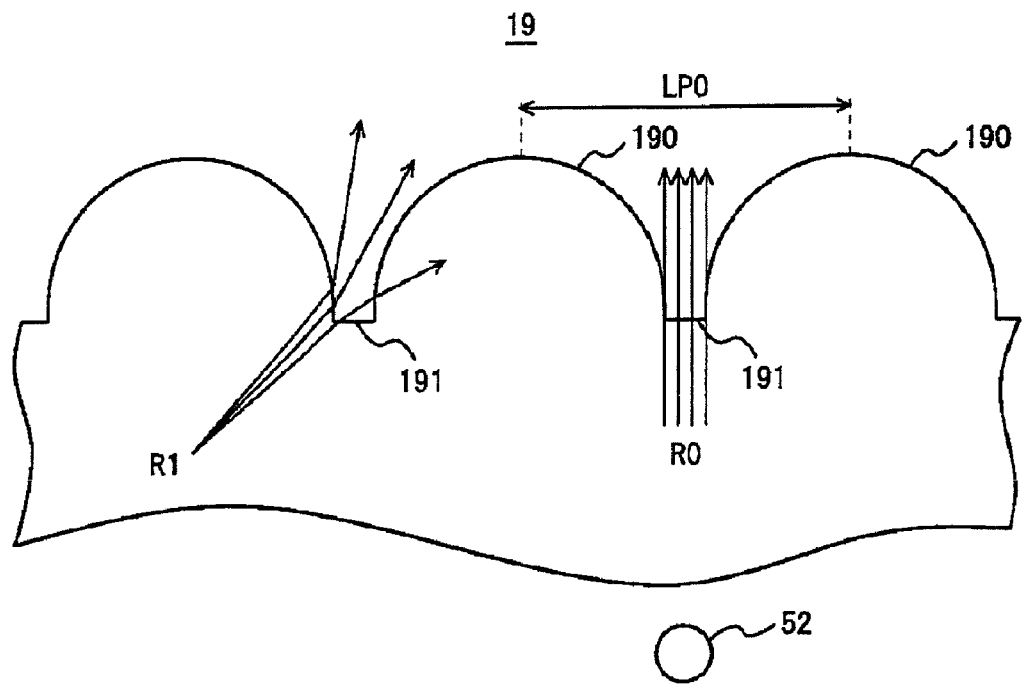
FIG. 4 is a view for use in illustrating the mechanism of how luminance unevenness is generated using a conventional micro lens array sheet.

When a conventional micro lens array sheet 19 having a shape as shown in FIG. 4 in cross section is used as the optical lens sheet 18, the luminance of lines 520 immediately above the line sources 52 is higher than the other part as shown in FIG. 3, in other words, so-called luminance unevenness is caused. As shown in FIG. 4, on the surface of the conventional micro lens array sheet 19, a flat space (hereinafter referred to as "flat part") 191 is present between adjacent micro lenses 190. When the flat part 191 is provided immediately above a line source 52, light R0 emitted perpendicularly from the line source 52 is incident perpendicularly to the flat part 191. At the time, the flat part 191 emits the incident light R0 perpendicularly as it is. In this way, the luminance unevenness is generated.

Figure 5:
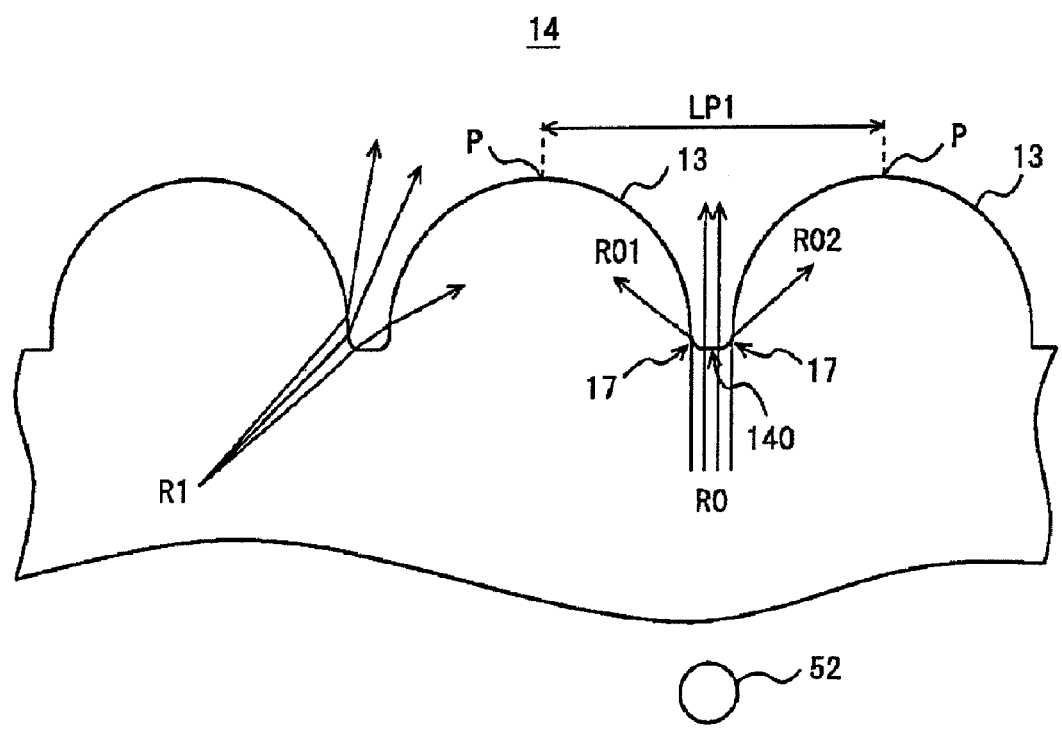
FIG. 5 is a view for use in illustrating the mechanism of how luminance unevenness is suppressed using the micro lens array sheet shown in FIG. 1.

On the other hand, using the micro lens array sheet 14 according to the embodiment as the optical lens sheet 18, the luminance unevenness can be suppressed. Referring to FIG. 5, when adjacent micro lenses 13 have the same size and the distance between the lens peaks P (hereinafter referred to as "lens pitch") LP1 is equal to the lens pitch LP0 in the conventional micro lens array sheet 19, the flat part 140 between the micro lenses 13 is smaller than the flat part 191 in the conventional micro lens array sheet 19. This is because the peripheral edge part 17 of the micro lens 13 is curved in a concave shape. Therefore, part of the light R0 (R01 and R02 in FIG. 5) from a light source is totally reflected or refracted by the peripheral edge part 17 and is not emitted in the perpendicular direction. More specifically, the peripheral edge part 17 reduces the percentage of the perpendicularly emitted light from the light source 52 to be emitted straightforward. Consequently, the luminance unevenness can be suppressed more than in the conventional case.

Note that the micro lens array sheets 14 and 19 both direct obliquely incident light R1 in the perpendicular direction. Therefore, the micro lens array sheet 14 can improve the front side luminance as much as the conventional micro lens array sheet 19 does.

Referring back to FIG. 2, the micro lens 13 preferably has a height $H_{13}$ in the range from 17.5 μm to 22.5 μm and a lens diameter $LD_{13}$ in the range from 36.5 μm to 46.5 μm. Here, the lens diameter $LD_{13}$ refers to the distance between the edges ED of the micro lens 13.

The preferable width $W_{17}$ of the peripheral edge part 17 is from 1 μm to 5 μm, more preferably from 2 μm to 5 μm. The preferable height $H_{17}$ of the peripheral edge part 17 is from 1 μm to 5 μm, more preferably from 2 μm to 5 μm. Here, the width $W_{17}$ refers to the distance between the edge ED and the inflection point IP1. The height $H_{17}$ refers to the height from the edge ED to the inflection point IP1 on the lens surface. The width $W_{13}$ of the flat part 140, i.e., the minimum distance between the edges ED of adjacent micro lenses 13 is preferably from 1 μm to 5 μm.

These dimensions can be measured into details for example by observing a section of the micro lens array sheet 14 including the peaks P under observation means such as a digital microscope (VHX-100) manufactured by KEYENCE CORPORATION at about 1000×.

Figure 6:
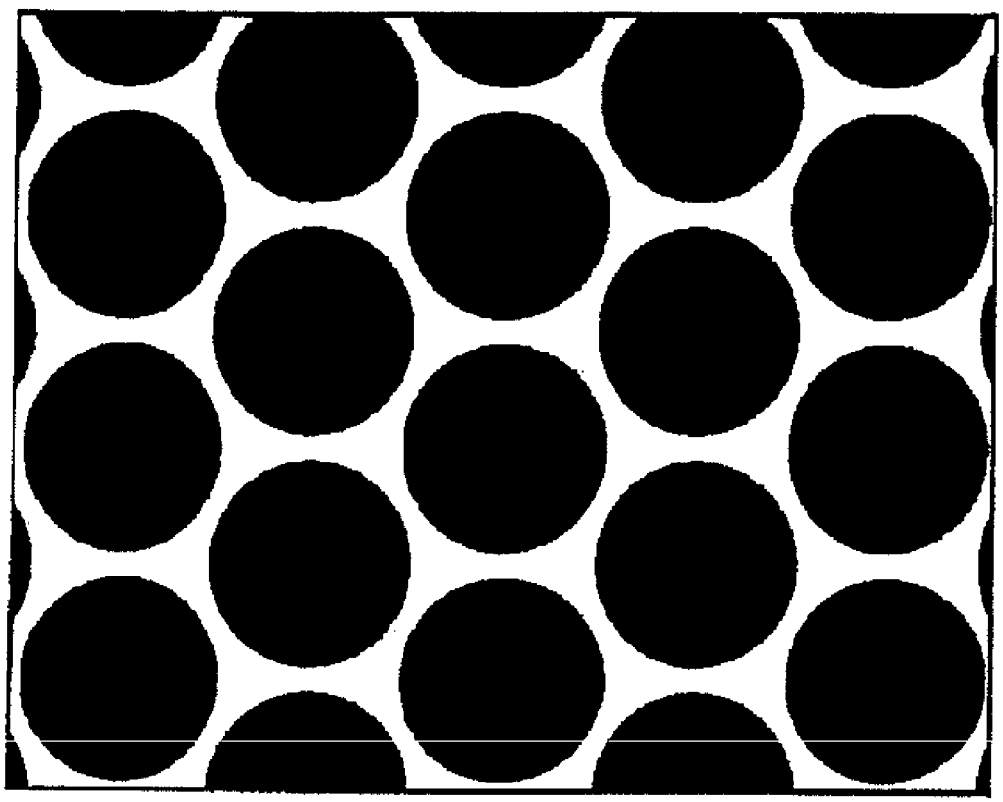
FIG. 6 is a view showing an image example produced by taking a photograph of the micro lens array sheet shown in FIG. 1 from immediately above using a digital microscope and specifying the area occupied by the micro lenses by image processing.

When the surface 151 having the micro lenses 13 formed thereon is viewed from immediately above, the ratio of the area occupied by the micro lenses 13 to the area of the entire surface 151 (hereinafter referred to as "lens occupancy") is preferably from 70% to 90%. The surface 151 of the substrate is observed from immediately above using the digital microscope described above and the result is subjected image processing as shown in FIG. 6, so that the area occupied by the micro lenses 13 is specified. In FIG. 6, the total area of the black part equals the area occupied by the micro lenses 13.

When the dimensions of the micro lens 13 are within the above-described ranges, the luminance unevenness can be suppressed more effectively. When the micro lens array sheet 14 is used in a backlight device for a liquid crystal display, the luminance of the pixels can be more equalized because the size of the micro lenses 13 is sufficiently small with respect to the size of the pixels. If the lens occupancy is within the above-described range, high front side luminance can be obtained. Note that if the size and lens occupancy are outside the above-described ranges, the luminance unevenness can be suppressed to some extent.

The peripheral edge part 17 may have a prescribed curvature or a plurality of different curvatures. For example, the curvature may be reduced toward the surface 151. In this case, the curve of the peripheral edge part 17 becomes gentler toward the surface 151.

2. Method of Manufacturing Micro Lens Array Sheet

The micro lens array sheet 14 according to the embodiment is produced by the roll-to-roll method using a molding roll. Now, the method of manufacturing the micro lens array sheet 14 will be described.

Figure 7:
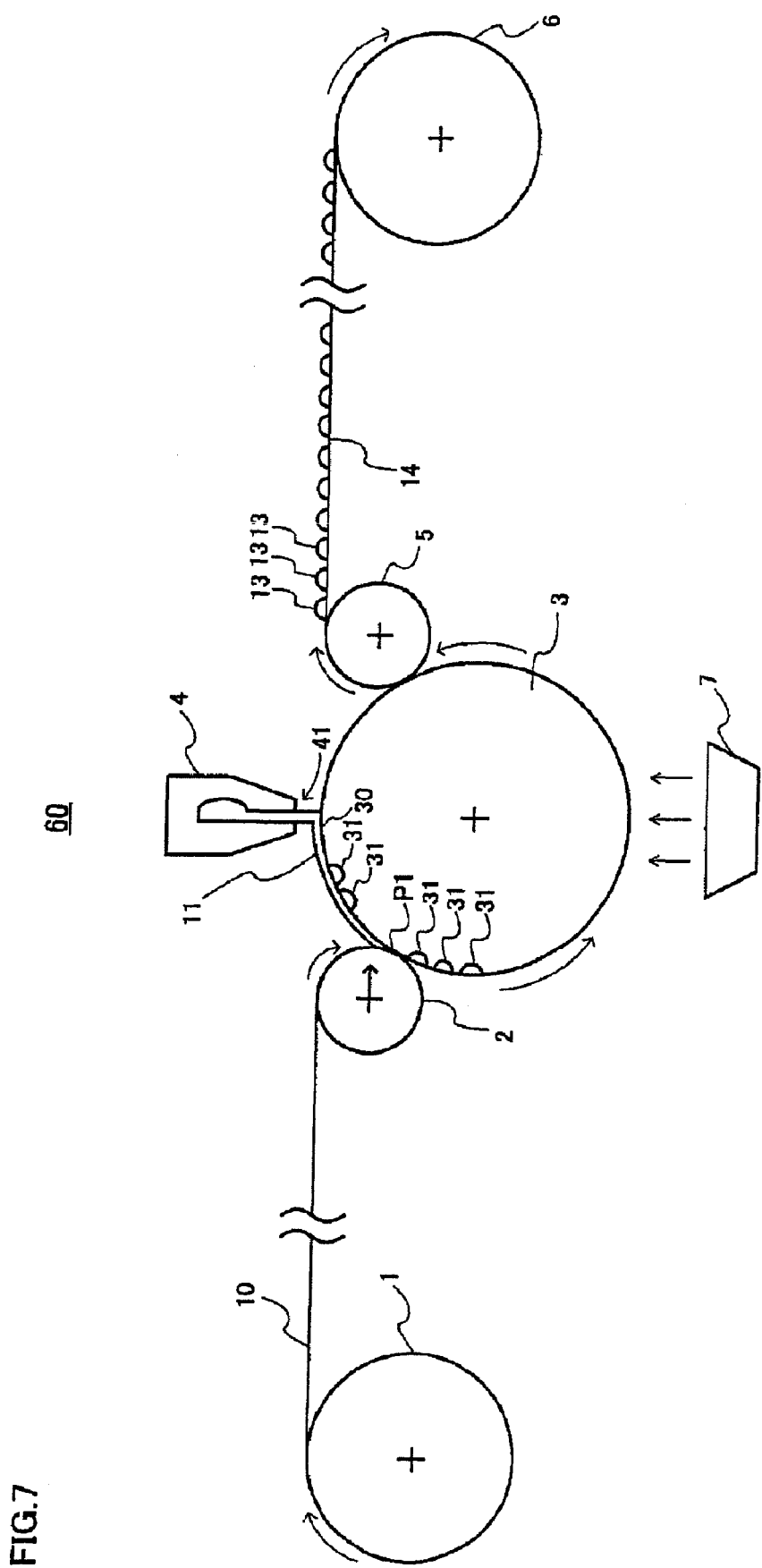
FIG. 7 is a general view of a device for manufacturing the micro lens array sheet shown in FIG. 1.

Referring to FIG. 7, a manufacturing device 60 for the micro lens array sheet 14 includes a substrate film roll 1, a nip roll 2, a molding roll 3, a dye coater 4, a feeding roll 5, a take-up roll 6, and an exposure unit 7.

The molding roll 3 has an outer peripheral surface 30 having a plurality of lens forming holes 31. The plurality of lens forming holes 31 correspond to the plurality of micro lenses 13 arranged two-dimensionally on the micro lens array sheet 14. The molding roll 3 will later be described in the following paragraphs.

The substrate film roll 1 unwinds a substrate film 10 wound around its outer peripheral surface as it turns clock-wise in FIG. 7. The unwound substrate film 10 is transported toward the molding roll 3.

The dye coater 4 provided on the upper side of the molding roll 3 discharges ionizing radiation curing resin in a liquid state and coats the outer peripheral surface 30 of the molding roll 3 being rotated anti-clockwise in FIG. 7. At the time, the ionizing radiation curing resin coated on the outer peripheral surface 30 of the molding roll 3 fills the lens forming holes 31 and forms an ionizing radiation curing resin film 11 on the outer peripheral surface 30 of the molding roll 3.

The nip roll 2 provided on the upper side before the molding roll 3 passes the substrate film 10 transported from the substrate film roll 1 between itself and the molding roll 3 having the ionizing radiation curing resin film 11 thereon. At the time, the nip roll 2 presses the substrate film 10 toward the molding roll 3. In this way, the substrate film 10 is contacted to the ionizing radiation curing resin film 11.

Note that in FIG. 7, after the ionizing radiation curing resin is applied on the molding roll 3, the substrate film 10 is contacted thereto, but the ionizing radiation curing resin may be applied on the substrate film 10 instead of the molding roll 3 and then the ionizing radiation curing resin on the substrate film 10 may be contacted to the molding roll 3.

The exposure unit 7 directs ionizing radiation to the molding roll 3. The ionizing radiation curing resin film 11 and the ionizing radiation curing resin filled within the lens forming holes 31 on the outer peripheral surface 30 of the molding roll 3 are cured by the ionizing radiation from the exposure unit 7. In this way, the micro lens array sheet 14 having the plurality of micro lenses 13 is formed.

The micro lens array sheet 14 wound around the molding roll 3 is removed from the molding roll 3 and transported to the take-up roll 6 through the feeding roll 5. Through these steps, the micro lens array sheet 14 is produced.

Note that the substrate 15 in FIG. 2 includes the substrate film 10 and the ionizing radiation curing resin film 11 cured on the substrate film 10. However, when the ionizing radiation curing resin is applied on the molding roll 3 without forming the ionizing radiation curing resin film 11, the micro lenses 13 consisting of the ionizing radiation curing resin may be formed directly on the substrate film 10. In this case, the substrate 15 in FIG. 2 is made of the substrate film 10.

3. Molding Roll

Now, the molding roll 3 for producing the micro lens array sheet 14 will be described.

Figure 8:
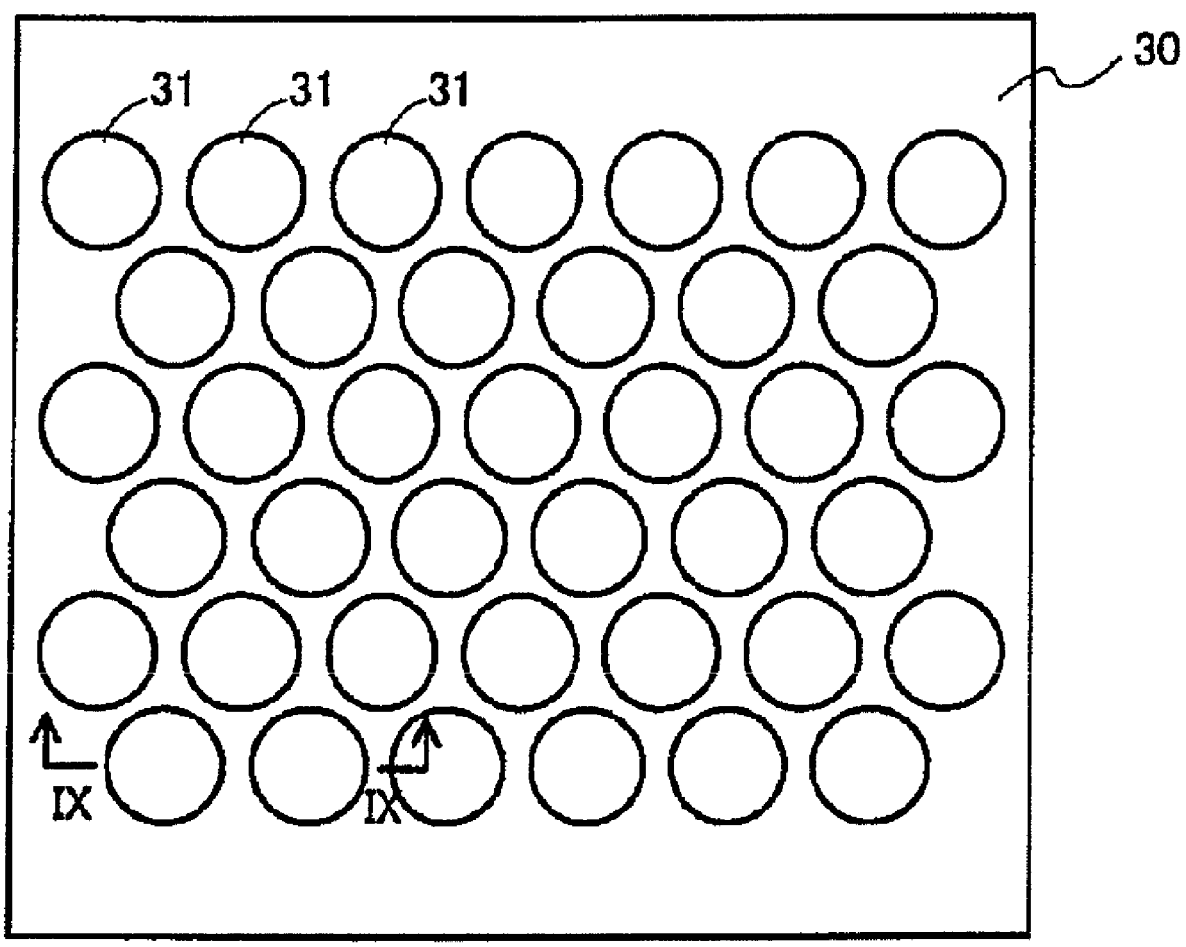
FIG. 8 is a developed view of the outer peripheral surface of the molding roll shown in FIG. 7.

FIG. 8 is a developed view of the outer peripheral surface of the molding roll 3. Referring to FIG. 8, the molding roll 3 has a plurality of lens forming holes 31 on the outer peripheral surface 30. The plurality of lens forming holes 31 are arranged in a lattice pattern on the outer peripheral surface 30. The arrangement of the lens forming holes 31 corresponds to the arrangement of micro lenses 13 on the micro lens array sheet 14.

Figure 9:
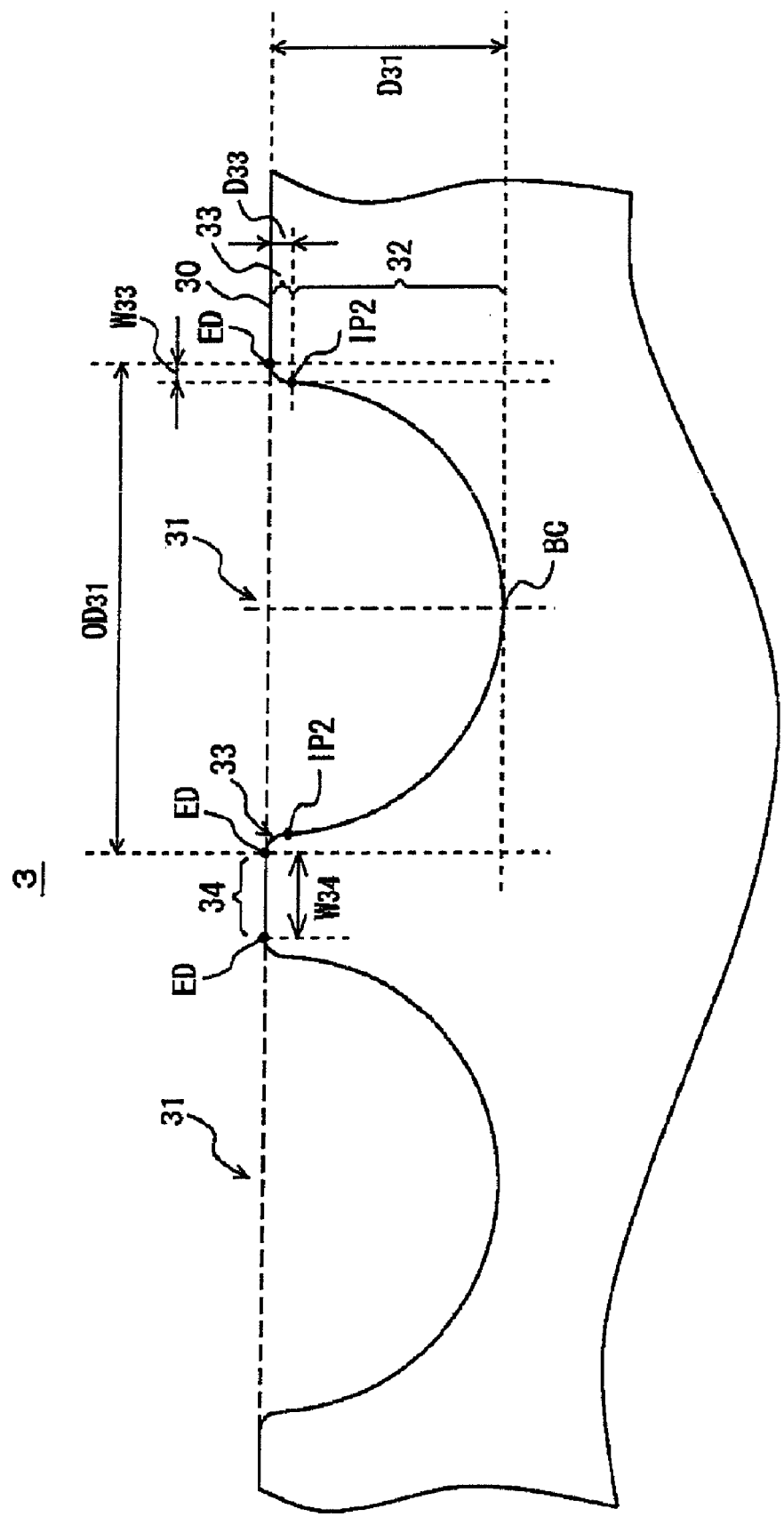
FIG. 9 is a sectional view taken along line IX-IX in FIG. 8.

Referring to FIG. 9, the surface of each lens forming hole 31 includes a concave part 32 and a peripheral edge part 33. The concave part 32 is from the bottom center BC of the lens forming hole 31 to the peripheral edge part 33 and has a spherical or elliptical surface. The peripheral edge part 33 is formed between the concave part 32 and the outer peripheral surface 30. The peripheral edge part 33 is rounded, curved in a convex shape and smoothly connected to the outer peripheral surface 30. As shown in FIG. 9, the sectional shape of the lens forming hole 31 is defined by a curve including inflection points IP2. The concave part 32 is the part between the bottom center BC and the inflection points IP2, and the peripheral edge part 33 is the part between the inflection point IP2 and the edge ED.

As described above, when the micro lens array sheet 14 is produced by the roll-to-roll method, the micro lens array sheet 14 cured by ionizing radiation is removed from the molding roll 3 and transported to the take-up roll 6.

Figure 10:
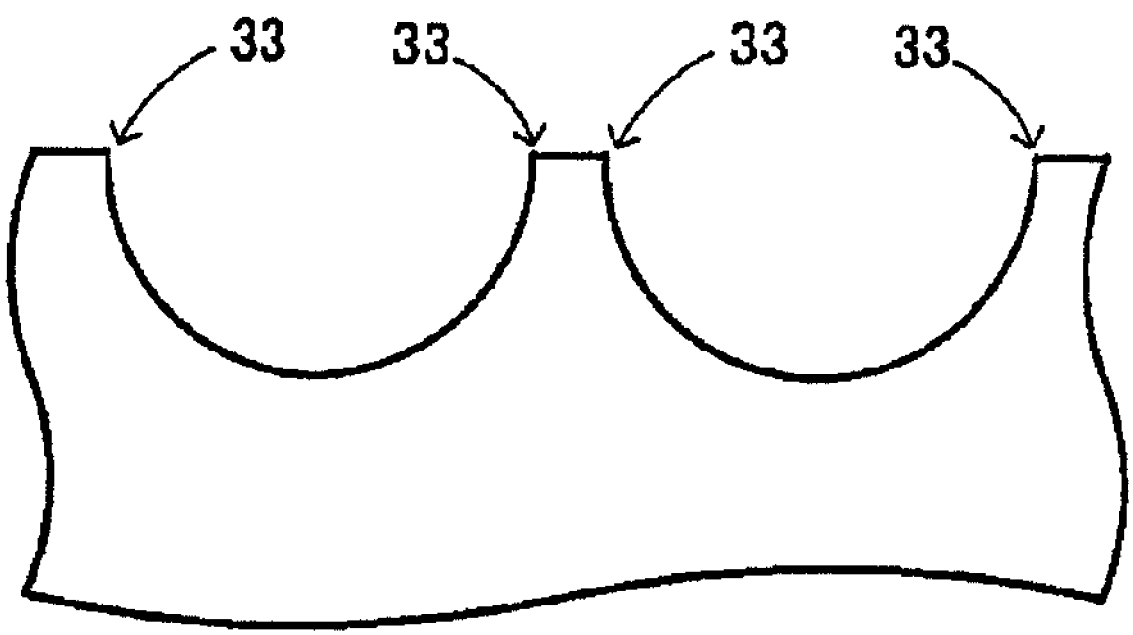
FIG. 10 is a view showing a cross sectional shape of a conventional molding roll.

At the time, as shown in FIG. 10, if the peripheral edge part 33 is not rounded, the micro lens array sheet 14 is not easily removed from the molding roll 3. If the molding roll as shown in FIG. 10 is used, the micro lens array sheet 14 can be removed from the molding roll 3 as some micro lenses 13 still remain at the lens forming holes. In this case, the micro lens array sheet 14 has locations without micro lenses 13.

When the peripheral edge parts 33 are rounded as shown in FIG. 9, the micro lenses 13 are more easily removed from the lens forming holes 31. Therefore, the lacking of micro lenses on the micro lens array sheet 14 removed from the molding roll 3 can be suppressed. Note that the peripheral edge part 33 may have a prescribed curvature or a plurality of curvatures. For example, the curvature may be reduced toward the outer peripheral surface 30. In this case, the curve of the peripheral part 33 is gentler toward the outer peripheral surface 30.

Furthermore, at the outer peripheral surface 30 of the molding roll 3, the surface part 34 between two adjacent lens forming holes 31 is preferably flat as shown in FIG. 9. If the surface part 34 is a convex curve surface, the part becomes more prone to cracks. The flat surface part 34 can suppress cracks from forming and the useful life of the molding roll 3 can be restrained from decreasing.

The preferable depth $D_{31}$ of the lens forming hole 31 is from 17.5 µm to 22.5 µm and the preferable opening diameter $OD_{31}$ is from 36.5 µm to 46.5 µm. The depth $D_{33}$ of the peripheral edge part 33 is preferably from 1 µm to 5 µm, more preferably from 2 µm to 5 µm. The width $W_{33}$ of the peripheral part 33 is preferably from 1 µm to 5 µm, more preferably from 2 µm to 5 µm. Here, the depth $D_{33}$ refers to the depth of the lens forming hole 31 from the edge ED to the inflection point IP2. The width $W_{33}$ refers to the width (roll-axial distance) between the edge ED and the inflection point IP2. The width $W_{34}$ of the flat part 34, i.e., the minimum distance between the edges ED of adjacent lens forming holes 31 is preferably from 1 µm to 5 µm.

When $D_{31}$, $OD_{31}$, $D_{33}$, $W_{33}$, and $W_{34}$ are within the above-described ranges, the above-described advantage can effectively be obtained. Note however that if these dimensions of the lens forming holes are different from those described above, the above-described advantage can be obtained to some extent.

The ratio of the total area of the opening of the lens forming holes 31 to the area of the entire outer peripheral surface 30 of the molding roll 3 is preferably from 70% to 90%. In this range, a high luminance improvement effect can be provided by the produced micro lens array sheet 14.

The molding roll 3 is produced by the following method. A molding roll whose outer peripheral surface 30 is made of a copper layer having a prescribed thickness is prepared. A plurality of holes corresponding to micro lenses 13 are formed on the outer peripheral surface 30 of the molding roll by laser platemaking or the like. At the time, the edge of each hole is not yet rounded. Then, the outer peripheral surface 30 thus provided with the plurality of holes thereon is subjected to chromium plating and a chromium plating layer is formed on the outer peripheral surface 30 and the holes formed on the outer peripheral surface 30. At the time, the thickness of the chromium plating layer to form is adjusted, so that rounded peripheral edge parts 33 are formed. Note that as the thickness of the chromium plating layer increases, the depth $D_{33}$ and the width $W_{33}$ of the peripheral edge part 33 increase.

Through these steps, the molding roll 3 is produced. The molding roll 3 can be manufactured by methods other than the above-described manufacturing method. For example, the peripheral edge parts of the lens forming holes 31 may be chamfered into a round shape by mechanical working and rounded peripheral edges part 33 can be formed.

Although the embodiment of the present invention has been described, the same is by way of illustration and example only and is not to be taken by way of limitation. The invention may be embodied in various modified forms without departing from the spirit and scope of the invention.

The invention claimed is:

1. A micro lens array sheet for use in a backlight device, comprising:
    a sheet type substrate; and
    a plurality of micro lenses arranged on said substrate, said plurality of micro lenses each having a surface,
    the surface of said micro lens comprising a convex part having a spherical or elliptical surface and a peripheral edge part formed between said convex part and said substrate and curved in a concave shape,
    wherein said micro lens has a height from 17.5 μm to 22.5 μm and a lens diameter from 36.5 μm to 46.5 μm,
    said peripheral edge part has a width from 1 μm to 5 μm and a height from 1 μm to 5 μm, and
    when the surface of said substrate provided with said plurality of micro lenses is viewed from immediately above, the ratio of the area occupied by said plurality of micro lens to the total area of the surface of said substrate is at least 70%.

2. A molding roll for producing a micro lens array sheet comprising a plurality of lens forming holes formed on its outer peripheral surface,
    said plurality of lens forming holes each having a surface,
    the surface of said lens forming hole comprising a concave part having a spherical or elliptical surface and a rounded peripheral edge part formed between said concave part and the outer peripheral surface of said molding roll.

3. The molding roll according to claim 2, wherein said lens forming hole has a depth from 17.5 μm to 22.5 μm and a lens outer diameter from 36.5 μm to 46.5 μm,
    said peripheral edge part has a width from 1 μm to 5 μm and a depth from 1 μm to 5 μm, and
    the ratio of the total area of the opening of said lens forming holes to the total area of the outer peripheral surface of said molding roll is at least 70%.

* * * * *